United States Patent [19]
Burg

[11] Patent Number: 5,872,966
[45] Date of Patent: Feb. 16, 1999

[54] SYSTEM AND METHOD FOR LOGGING AND ENABLING FURTHER MANIPULATION OF SYSTEM STATE INFORMATION

[75] Inventor: Michael Burg, Cupertino, Calif.

[73] Assignee: Apple Computer, Inc., Cupertino, Calif.

[21] Appl. No.: 644,702

[22] Filed: May 10, 1996

[51] Int. Cl.[6] .................................................... G06F 9/06
[52] U.S. Cl. ...................... 395/651; 395/681; 395/200.5; 395/830
[58] Field of Search ...................... 395/651, 652, 395/653, 681, 828, 830, 200.5, 200.51, 200.52

[56] References Cited

U.S. PATENT DOCUMENTS

| | | | |
|---|---|---|---|
| 4,589,063 | 5/1986 | Shah et al. | 395/828 |
| 5,386,567 | 1/1995 | Lien et al. | 395/653 |
| 5,517,646 | 5/1996 | Piccirillo et al. | 395/651 |
| 5,559,965 | 9/1996 | Oztaskin et al. | 395/284 |
| 5,655,148 | 8/1997 | Richman et al. | 395/828 |
| 5,696,970 | 12/1997 | Sandage et al. | 345/681 |

*Primary Examiner*—Kevin A. Kriess
*Attorney, Agent, or Firm*—Carr & Ferrell LLP

[57] ABSTRACT

A client sends a state information message such as an error message or a state information manipulation request to a logging system server. The logging system server prioritizes the messages and requests, and sends them to the appropriate components. A notification engine and a notification manager control notifying the user of the state information message. A plugin server and plugins control logging the state information message and control other state information manipulation such as generating statistical analysis data and paging a user. The plugin server enables additional plugins to be added to the system. An external notification manager sends the state information message and possibly other information such as the statistical analysis data to an external system such as technical support. A system fatal error controller locks up the system during a system fatal error to prevent any additional data corruption.

25 Claims, 8 Drawing Sheets

State Information Message Layout

SYSTEM AND METHOD FOR LOGGING AND ENABLING FURTHER MANIPULATION OF SYSTEM STATE INFORMATION

CROSS-REFERENCE TO RELATED APPLICATIONS

This application is related to co-pending patent application Ser. No. 08/644,255, filed on May 10, 1996, entitled "System and Method for Handling Dynamic Changes in Device States," by inventors Holly Knight, the subject matter of which is hereby incorporated by reference. These related applications are commonly assigned to Apple Computer.

BACKGROUND OF THE INVENTION

1. Field of the Invention

This invention relates generally to computer systems, and more particularly to a system and method for logging and manipulating system state information.

2. Description of the Background Art

At the current stage of computer technology, occasional system and application program errors are unavoidable. There are four basic types of program errors: the informational, the warning, the fatal, and the system fatal. An informational error is caused by a benign condition, such as "printer out of paper." A warning error is caused by a correctable condition, such as a printer unexpectedly going "off-line," a failure of an application program to locate a configuration file or an abnormal termination of an application program, which if left unattended could compromise system stability. A fatal error is caused by a condition which indicates an unstable system, such as server shutdown or a corrupt system file data structure, and thus warrants system rebooting. Lastly, a system fatal error is caused by a condition which indicates a totally unusable system, such as unexpected page faults by the microkernel, failure of the primary hard drive, or abnormal termination of a critical operating system server, and thus warrants system shut down to avoid additional problems.

Conventional operating systems, such as the VMS® operating system produced by the Digital Equipment Corporation of Maynard, Mass. and the Windows NT® operating system produced by the Microsoft Corporation of Redmond, Wash., are generally limited to storing in a system log a coded message representing each error. When users contact technical support for assistance, technicians can review the coded messages, but typically find the messages insufficiently descriptive for desired diagnostic purposes. Thus, technicians resort to troubleshooting. Therefore, a system and method are needed for preserving more descriptive messages in a system log and for enabling further manipulation of the messages.

SUMMARY OF THE INVENTION

The present invention overcomes limitations and deficiencies of previous error logging systems by providing an improved system and method for logging and further manipulating system state information. The invented system includes a central processing unit (CPU) that connects with a memory. The memory stores an operating system program, including a logging system which has a logging system server, a notification engine, a notification manager, a plugin server, plugins, an external notification manager and a system fatal error controller. The logging server prioritizes state information messages and delivers the prioritized messages to the other components. The notification engine and the notification manager present state information messages to the user. The plugin server and plugins control logging state information in a system log and control other functions such as for example calling a pager, preparing a statistical analysis, or managing errors. Plugins are programs, such as device drivers, for controlling target systems in this case to manipulate system state information. More particularly, a log plugin which includes a self-initialization routine and adheres to a predetermined protocol for communicating with the plugin server gathers and adds system state information to a system log stored in memory. Other plugins, each of which also includes a self-initialization routine and adheres to a predetermined protocol for communicating with the plugin server, may be added to the system for performing other functions. The external notification manager forwards state information, and possibly other information such as statistical data, through a communications interface to external systems such as technical support. The system fatal error controller manages system fatal errors, by locking the system and forcing system reboot.

The present invention also provides a method for initializing the system including the plugins, a method for logging state information in a system log and enabling other manipulation of state information messages, a method for retrieving data from the system log, and a method for processing administrative type requests on the state information messages of the system log.

The system and method of the present invention add system state information to a system log to provide a more comprehensive and detailed mechanism for recording system state information. Further, the system and method provide an improved mechanism for handling system errors and for notifying the users, technical support persons and others. Still further, the system and method provide more detailed explanations of the state of the system to users and technical support persons, and add the more detailed explanations to the log for subsequent analysis. Even further, the system and method enable further manipulation of the system state information such as clearing the system log, sizing the system log to desired specifications, and generating charts for better information presentation. Still even further, the system and method use self-initialization routines to provide a mechanism for adding after manufacturing plugins which provide additional functions.

DETAILED DESCRIPTION OF THE PREFERRED EMBODIMENT

The following description illustrates a system and method for logging and further manipulating system state information. The description is by way of example only, and other variations and modifications are provided by the present invention. The embodiments are not intended to be exhaustive or limiting.

Figure 1:
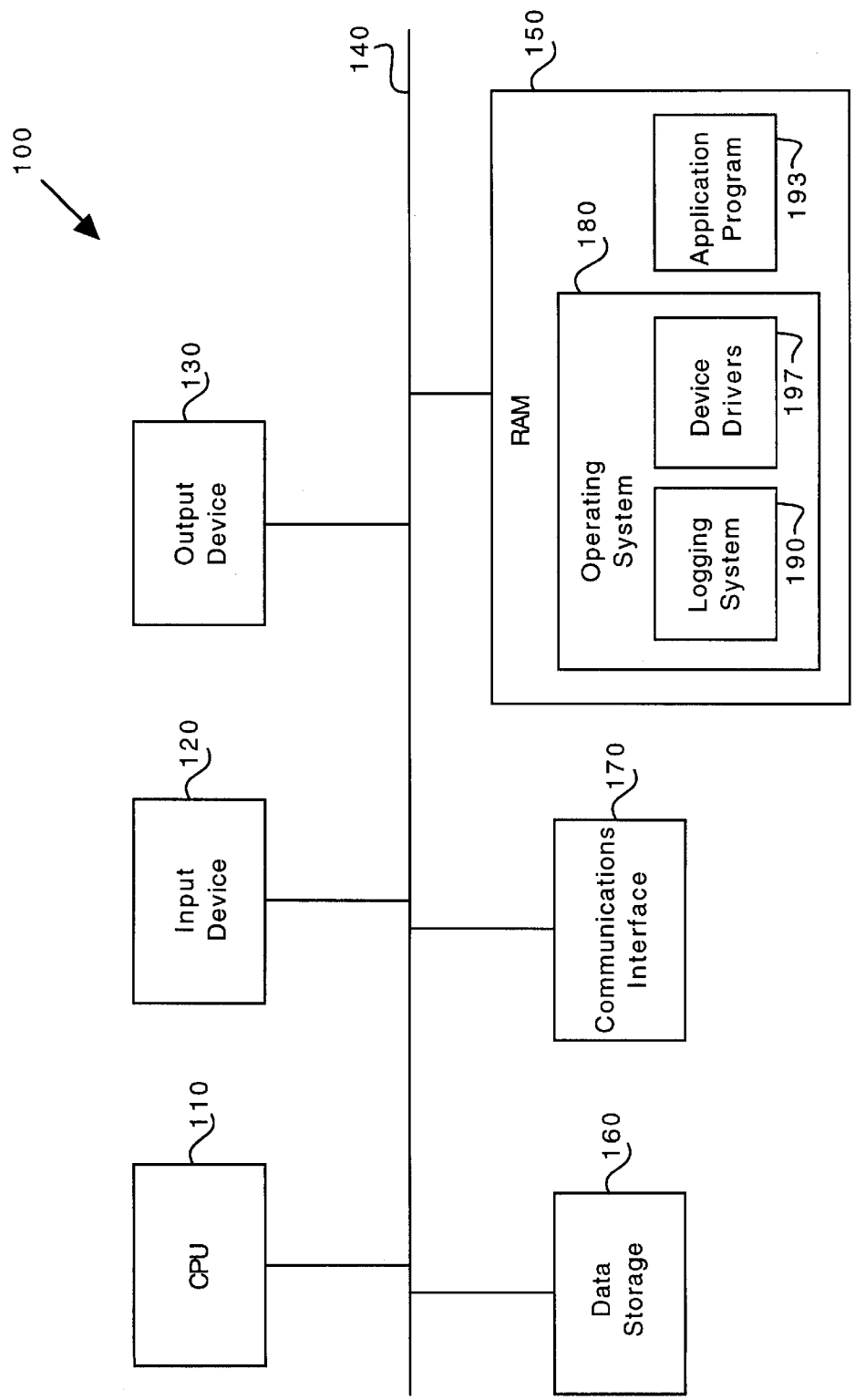
FIG. 1 is a block diagram of a computer system including a logging system in accordance with the present invention.

FIG. 1 is a block diagram of a computer system 100 including a Central Processing Unit (CPU) 110 based on a computer such as preferably a Power Macintosh manufactured by Apple Computer, Inc. of Cupertino, Calif. Computer system 100 comprises an input device 120 such as a keyboard and mouse, an output device 130 such as a Cathode Ray Tube (CRT) display, Random Access Memory (RAM) 150, data storage 160 including Read Only Memory (ROM) and a hard disk drive, and a communications interface 170, each coupled via a signal bus 140 to CPU 110.

Operating system 180 is a program which controls processing by CPU 110, and is typically stored in data storage 160 and loaded into RAM 150 for execution. Operating system 180 includes device drivers 197 for controlling the operations of devices, including input device 120, output device 130, RAM 150, data storage 160 and communications interface 170. Operating system 180 also includes a logging system 190 which records system 100 state information in a system log for subsequent diagnostic purposes and enables further manipulation of the state information. System 100 typically further includes an application program 193 for performing particular functions such as word processing.

Figure 2:
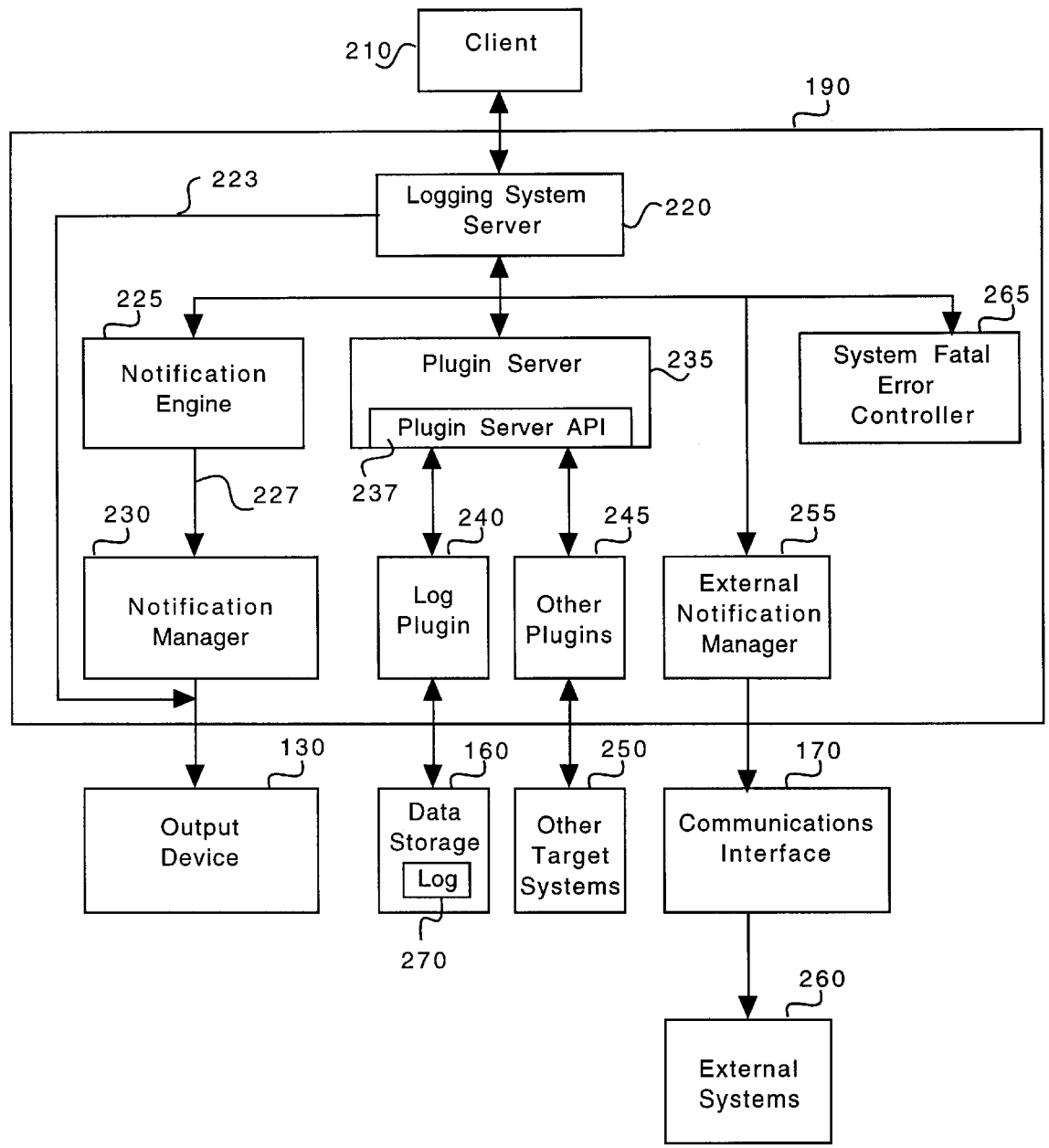
FIG. 2 is a block diagram of the FIG. 1 logging system.

FIG. 2 is a block diagram of logging system 190, which includes a logging system server 220, a notification engine 225, a notification manager 230, a plugin server 235, a log plugin 240, other plugins 245, an external notification manager 255 and a system fatal error controller 265. Logging system 190 operates in conjunction with preferably a client 210, an output device 130, data storage 160, target systems 250, a communications interface 170 and external systems 260.

Client 210 is a "device," such as a device driver 197 or other routine in an operating system 180, an application program 193 or a communications interface 170, for generating, or requesting manipulation of, system 100 state information. Client 210 generates system 100 state information for example if hardware components fail to respond, or if software components fail to locate known files or otherwise terminate abnormally.

Client 210 uses message passing or shared memory techniques to communicate system 100 state information or state information manipulation requests to logging system server 220. Message passing may be implemented using conventional techniques which include the steps of assigning each message a source and target address, and passing each message and responses server 220 based on these addresses. Shared memory techniques may be conventionally implemented by storing the state information to a mutually known and mutually accessible memory location. Preferably, only privileged clients 210, i.e. clients 210 such as Input/Output (I/O) device drivers 197 or operating system 180 which directly affect physical components of system 100, can access shared memory. Preferably, to avoid conflicting commands, only one client 210 at a time communicates with logging system server 220.

Logging system server 220 is a program, in communication with client 210, for prioritizing state information and state information manipulation requests based on criteria such as for example importance and criticality. Logging system server 220 preferably considers state information type, i.e. informational, warning, fatal, or system fatal, considers the content and the receiving order of the messages, and considers the client 210. Server 220 preferably handles fatal and system fatal messages immediately, and queues informational and warning messages and state information manipulation requests for scheduled handling. Queued messages and requests are preferably handled at predetermined intervals, such as once every few seconds, to avoid tying up system 100 resources. Alternatively, server 220 may store the messages and requests until the components inform server 220 that they are ready to receive further instruction. Since shared memory is considered more critical, messages delivered by shared memory have a higher priority than messages delivered by message passing.

Logging system server 220 forwards state information to notification engine 225, plugin server 235, external notification manager 255 and system fatal error controller 265, and forwards state information manipulation requests to plugin server 235. Since during system fatal errors the rest of system 100 is considered unreliable, server 220 as a "specialty function" uses bit block transfer techniques to deliver system fatal error messages such as "Bomb Boxes" via path 223 to output device 130. A "Bomb Box" is a graphical display image indicating a system fatal error.

System 190 enables users to designate which states will require user notification and which states will not. Notification engine 225 is a program for selecting, based on the state information, an appropriate message such as "Application program cannot find Preference File," or possibly no message, to the user. Notification engine 225 preferably compares successive state information messages to determine whether they are redundant. If a message is redundant, notification engine 225 preferably omits selecting the same user message a second time to avoid overwhelming a user, but still logs the second state information message to keep complete records. Notification engine 225 delivers the message selection via signal path 227 to notification manager 230, which is a user interface program for presenting selected messages on output device 130. For example, if output device 130 is a display device, notification manager 230 will include a conventional video driver.

Plugin server 235 is a program in communication with server 220, for receiving state information messages and state information manipulation requests from client 210, and outputting them to log plugin 240 and other plugins 245. Plugin server 235 includes an Application Program Interface (API) 237 for communicating with plugins 240, 245. Plugin server API 237 enables other plugins 245 to be added to system 190 by, for example, placing the plugins into a plugin system folder (not shown). Plugins 240, 245 are programs, which adhere to a predetermined protocol to communicate with API 237, for controlling a target system to perform a particular function. Plugins 240, 245 in general each include a power-up self-initialization routine which enables new plugins to be added to the system after its initial configuration. A plugin 240, 245 may include a device driver.

Figure 8:
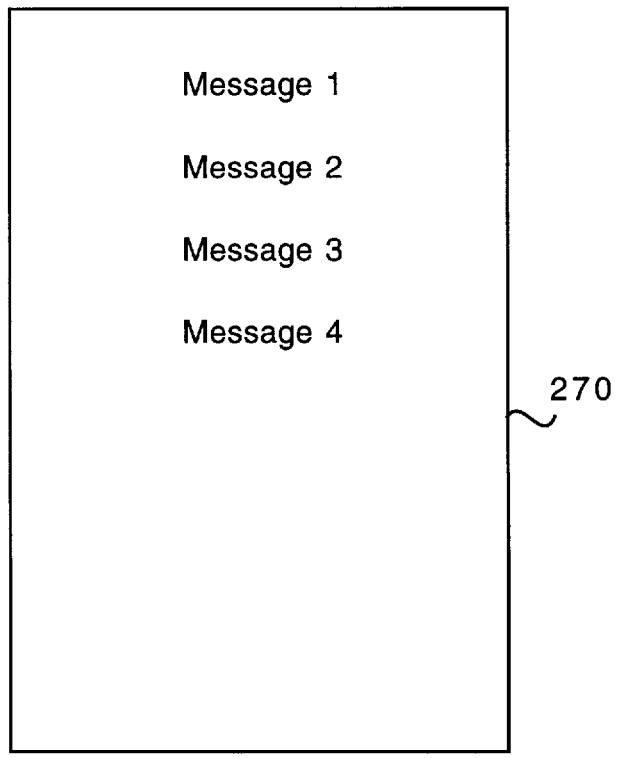
FIG. 8 illustrates an example system log.

More particularly, log plugin 240 is a device driver for adding state information to, and retrieving state information from, a log 270 stored in non-volatile data storage 160. Log 270 is preferably a linked list of a user-selected number of state information messages. An example log 270 containing four messages is illustrated in FIG. 8. The earliest messages on the list, for example Message 1 of FIG. 8, are preferably forced off by the latest messages, for example a new Message 5 (not shown), so the list stores only the current messages (in this example the current four messages).

Other plugins 245 enable additional manipulation of system 100 state information, and may provide functions such as error handling, user notification or technical support notification. Plugins 245 control other target systems 250, including communications interface 170, output devices 130 such as disks, pagers or printers, etc. For example, if plugin 245 receives an error message indicating that a hard disk drive in system 250 is not responding, the plugin 245 may for example redirect data to be stored through communications interface 170 to a network server's hard drive (not shown). Other plugins 245 may be supplied by original equipment manufacturers or third party vendors.

External notification manager 255 is a program, coupled to server 220, for delivering state information and possibly additional information through communications interface 170 to external systems 260, such as technical support. External notification manager 255 may determine that, for example, an error has occurred enough times or a particular error has occurred to warrant special attention. Accordingly, external notification manager 255 will deliver the state information and possibly statistical data through communications interface 170 in a conventional manner to a technical support service.

System fatal error controller 265 is a program, coupled to server 220, for managing messages which indicate a totally unusable system 100. For example, if selection of a faulty address pointer jeopardizes the integrity of a physical component such as a hard disk drive, controller 265 places system 100 in a "continuous loop" to force a system 100 reboot. System fatal error controller 265 handles system 100 fatal errors preferably only for privileged clients 210. Upon recognizing a system fatal error, controller 265 stores the error message in non-volatile memory such as an EEPROM, and upon the next successful reboot retrieves the message from the EEPROM and adds it to the state information log 270. In such a case, controller 265 performs as client 210.

Figure 3:
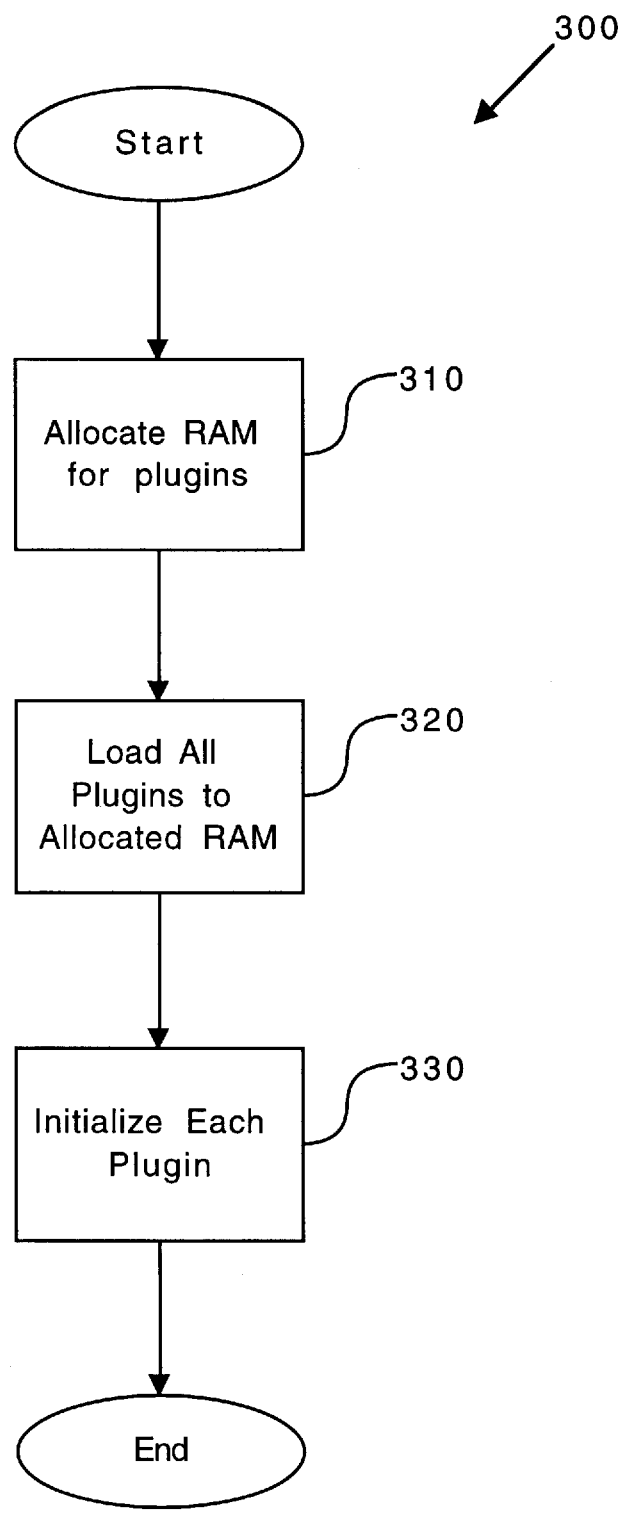
FIG. 3 is a flowchart illustrating a method for initializing the FIG. 2 plugins.

FIG. 3 is a flowchart illustrating a method 300 for system 100 to initialize plugins 240 and 245 upon start-up. Method 300 begins in step 310 by allocating space in RAM 150 for plugins 240, 245. System 100 in step 320 loads plugins 240, 245 from data storage 160 into the allocated space in RAM 150. If plugins 240, 245 are stored in a plugin system folder (not shown), step 320 retrieves the plugins from the folder.

Each plugin 240, 245 in step 330 performs its self-initialization routine. For example, log plugin 240 includes the following initialization steps: allocating space in RAM 150 for storing the state information log 270, checking the integrity of the allocated RAM, storing the previously-added messages of log 270 into the allocated RAM, scanning for the oldest and newest entries in log 270, and setting up pointers for these entries. Each other plugin 245 will perform its own particular initialization steps as provided by its self-initialization routines. Method 300 then ends.

Figure 4:
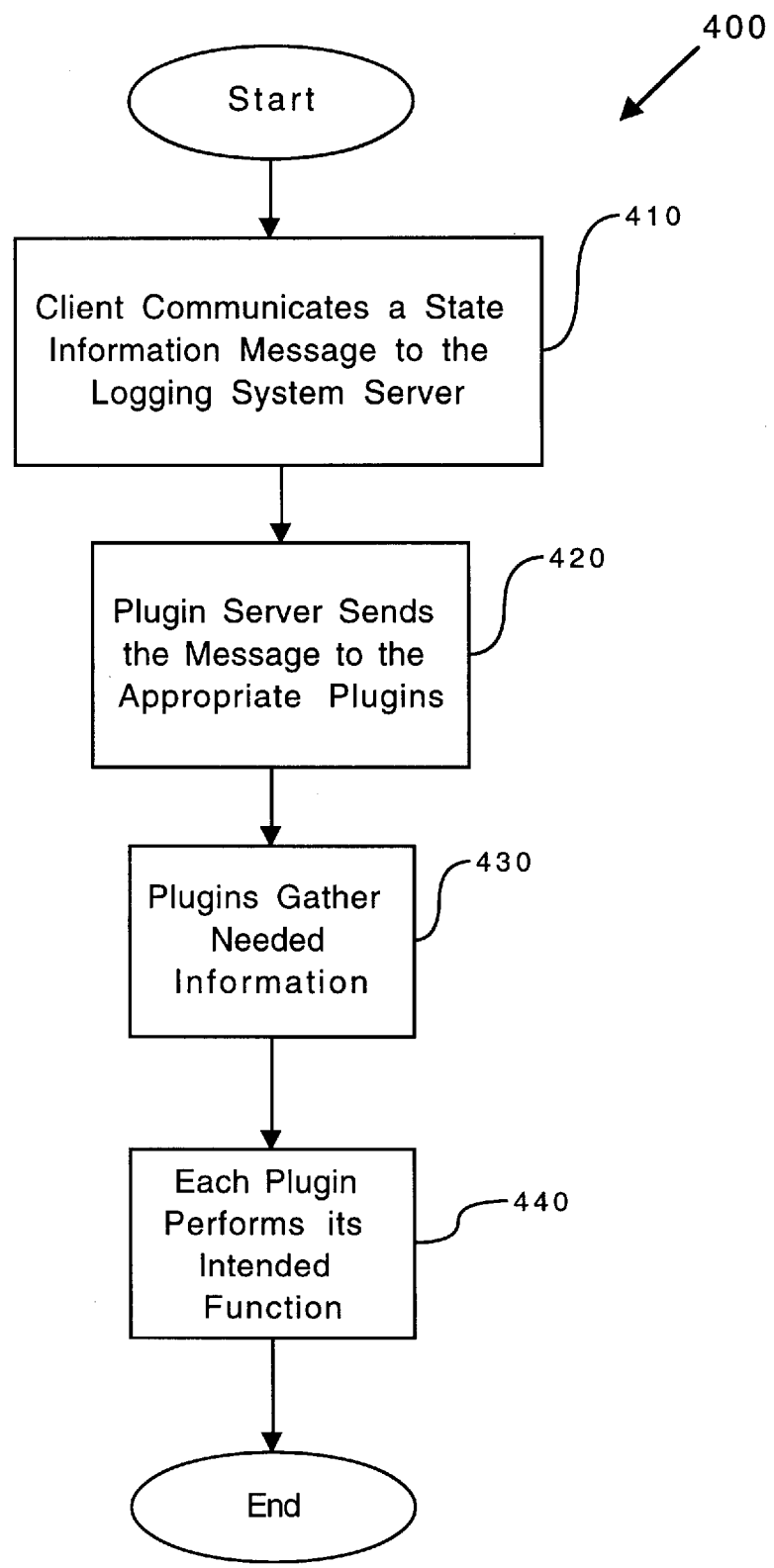
FIG. 4 is a flowchart illustrating a method for logging and enabling further manipulation of system state information.

FIG. 4 is a flowchart illustrating a method 400 for logging and further manipulating state information messages. Method 400 begins in step 410 with a client 210 communicating a state information message to logging system server 220, which prioritizes and sends the state information message to plugin server 235, which determines which of the plugins 240, 245 should receive the message. Accordingly, plugin server 235 in step 420 sends the message to the appropriate ones of plugins 240, 245. Alternatively, plugin server 235 can send all incoming messages to all plugins 240, 245, in which case each plugin 240, 245 can then determine whether the message was intended for it. Alternatively, plugin server 235 can store messages until pulled by the plugins 240, 245.

Each plugin 240, 245 in step 430 gathers the state information provided by client 210, and based on the plugin's function gathers any other needed information such as spreadsheet format, equations, etc. In step 440, each plugin 240, 245 performs its function. More particularly, log plugin 240 adds the state information message to the system log 270. Plugin 240 may provide the user with sufficient time to correct an error condition before storing the message to the system log 270, so that easily corrected errors are not added. Further, log plugin 240 may add only selected errors to the system log 270, so that trivial errors such as "printer Off-line" are not added. Each other plugin 245 performs its intended function, such as paging a user or other person or creating and delivering a statistical analysis to technical support. Method 400 then ends.

Figure 5:
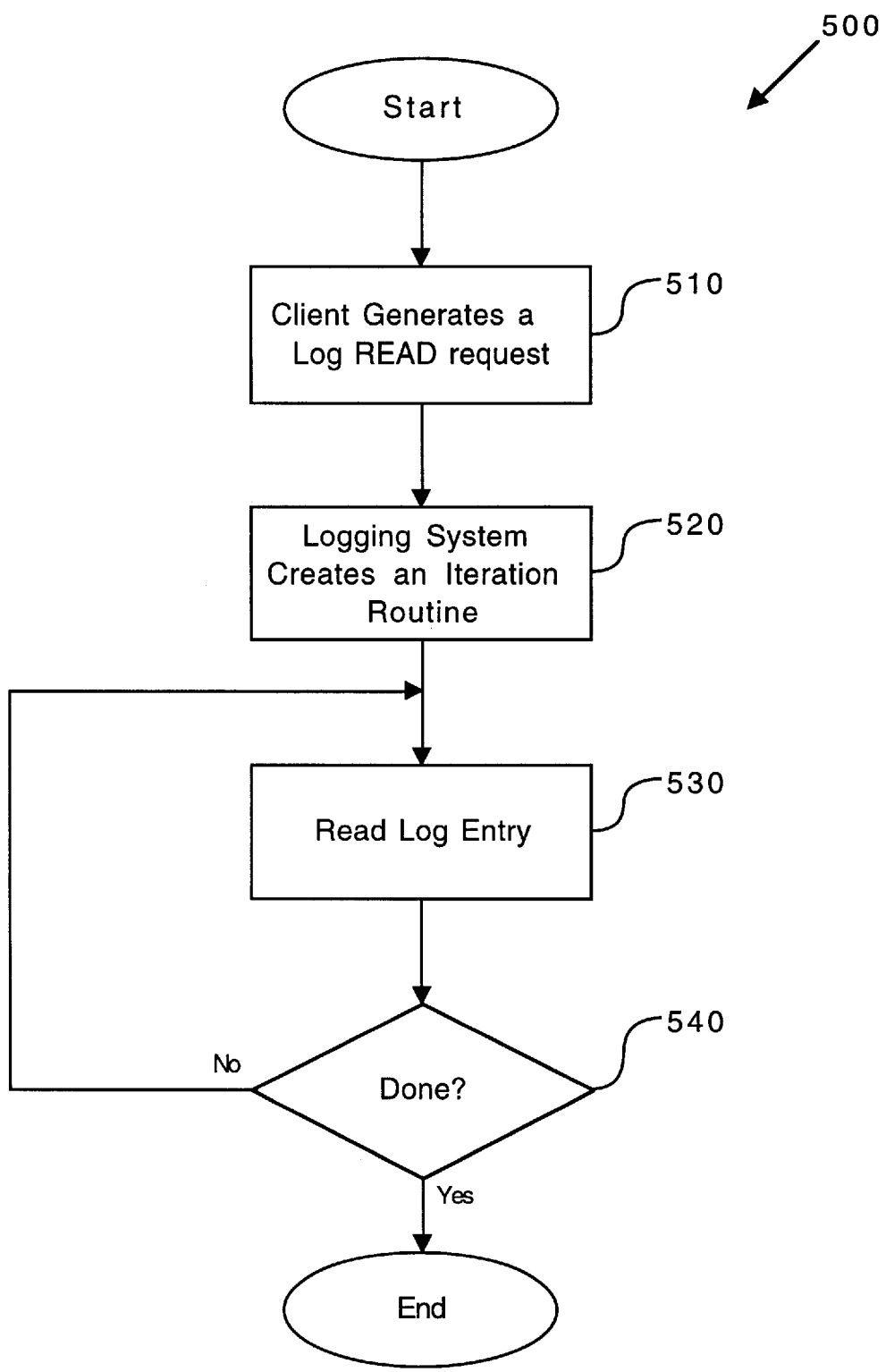
FIG. 5 is a flowchart illustrating a method for retrieving messages from the system log.

FIG. 5 is a flowchart illustrating a method 500 for retrieving state information messages from log 270. Method 500 begins in step 510 when a client 210 generates a request to read log 270. The READ request may be to read the entire log 270, to read some specified number such as twenty of the messages in log 270, to read log 270 in reverse chronological order, or otherwise. Client 210 sends the request to logging system server 220, which prioritizes the request for scheduled handling and accordingly delivers it to plugin server 235.

Plugin server 235 in step 520 recognizes the READ request and, if multiple READs are requested, instructs log plugin 240 to create an iteration routine for performing multiple READs. Creating an iteration routine includes retrieving the pointers specifying the address of the first and last relevant entries in log 270. Plugin server 235 sends the READ request, and possibly the create-iterator instruction, to log plugin 240 which in step 530 reads the specified message. Plugin 240 conventionally creates an iterator. When plugin 240 in step 540 determines, based on the iteration routine, that all iterations of the READ request have completed, method 500 ends. Otherwise, method 500 returns to step 530.

Figure 6:
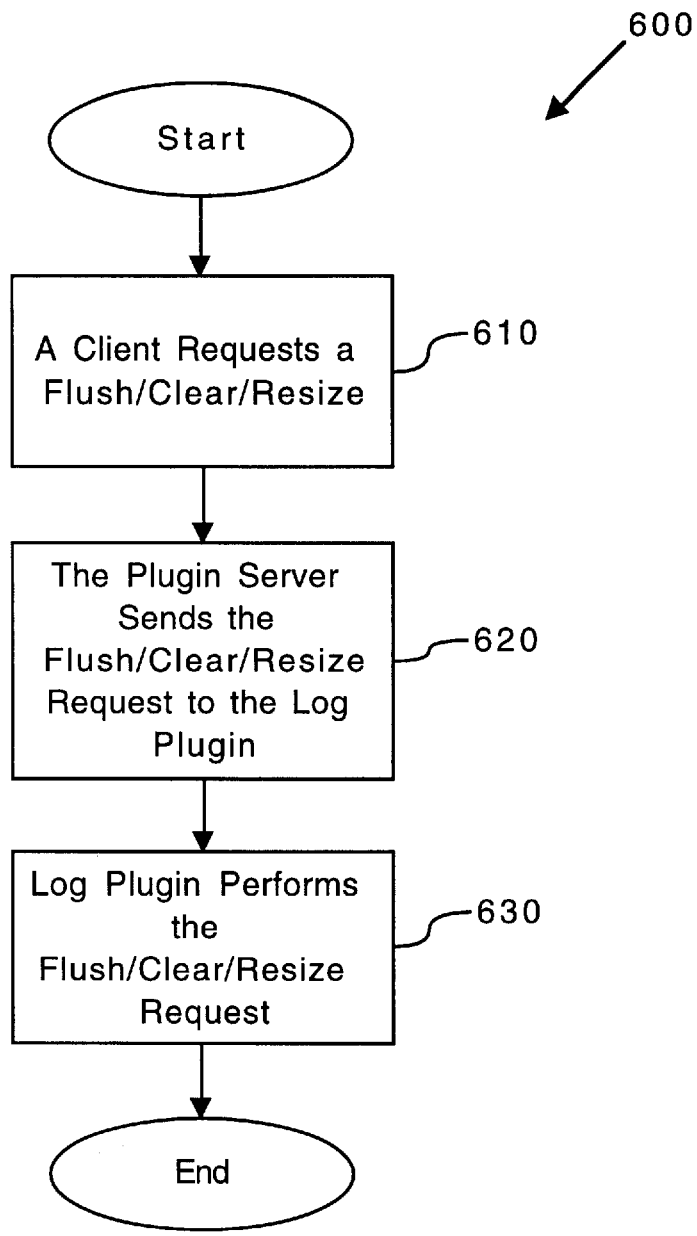
FIG. 6 is a flowchart illustrating a method for performing administrative type requests.

FIG. 6 is a flowchart illustrating a method 600 for performing an administrative type request. Administrative type requests include: flushing, i.e. to add immediately any queued state information messages to log 270; clearing, i.e. to delete the messages in log 270; and resizing, i.e. to modify the size of log 270 and the allocated section of memory for storing log 270.

A client 210 in step 610 generates and sends an administrative type request to logging system server 220, which prioritizes the request and sends it to plugin server 235. In step 620, plugin server 240 translates the request and sends it to log plugin 240. In step 630, plugin 240 performs the administrative request. That is, if the request is for a flush, plugin 240 adds the state information messages which are stored in queues to log 270. If the request is for a clear, plugin 240 deletes the messages in log 270. If the request is for a re-size, plugin 245 re-configures log 270 and re-allocates memory for storing log 270. Method 600 then ends.

Figure 7:
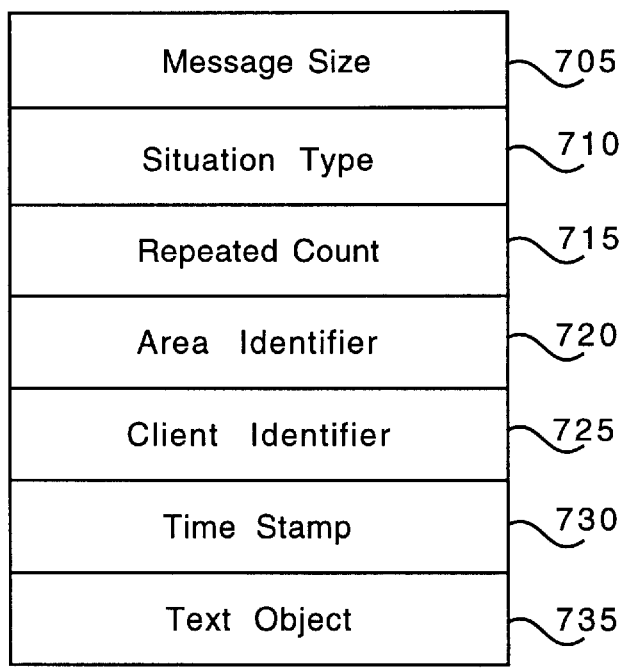
FIG. 7 illustrates an example layout of a state information message.

FIG. 7 is a block diagram of an example state information message. The example state information message includes a situation type field 710, a client identifier field 725, a time stamp field 730 and a text object field 735, and optionally further includes a message size field 705, a repeated count field 715 and an area identifier field 720.

Total message size field 705 specifies the size of the state information message, and is preferably limited to one kilobyte to conserve resources. Alternatively, an end bit for flagging the end of a message can be used. Situation type field 710 specifies the state information type, e.g.

informational, warning, fatal or system fatal. Repeated count field 715 indicates the number of times a client 210 has successively generated a particular message, to avoid redundant and wasteful message storage. However, redundant messages can alternatively be used. Area Identifier field 720 specifies the location of the situation causing the message in system 100, e.g. in operating system 180 or in CPU 110. Client identifier field 725 indicates the specific client 210, such as Claris Works, an Ethernet driver, the Finder, etc., causing the message. Time stamp field 730 specifies the date and time client 210 generated the state information message, and may be used by logging system server 220 to chronologically prioritize messages. Text object field 735 describes the state information in an appropriate and meaningful format, such as key words in a particular language.

The foregoing description is by way of example only, and other variations of the above-described embodiments and methods are provided by the present invention. Components of this invention may be implemented using a programmed general purpose digital computer, using application specific integrated circuits, or using a network of interconnected conventional components and circuits. Although the state information is being described herein based on system 100 errors, other system 100 states can similarly be logged and manipulated. The embodiments described herein are presented for purposes of illustration and are not intended to be exhaustive or limiting. Many variations and modifications are possible in light of the foregoing teaching. The system is limited only by the following claims.

What is claimed is:

1. A method for an operating system in a computer to cause a target system to manipulate state information messages generated by a client system, comprising the steps of:

providing a plugin, which includes a computer power-up self-initialization routine for configuring the plugin and adheres to a predetermined protocol for receiving state information messages and for controlling the target system;

executing the self-initialization routine; and using the plugin for receiving a client-generated state information message, and for controlling the target system to manipulate the message.

2. The method of claim 1 wherein said plugin comprises a log plugin for adding messages to a message log; and said target system comprises a data storage for storing the message log.

3. The method of claim 2 wherein the step of executing the self-initialization routine includes allocating memory in the data storage for the message log.

4. The method of claim 3 further comprising the steps of:

providing nonvolatile data storage;

if the state information message indicates a system fatal error then storing the message in the nonvolatile data storage;

powering-down said computer; and transferring the message from nonvolatile data storage to the message log by again powering-up the computer.

5. The method of claim 1 further comprising, before the step of using the plugin, the steps of:

providing a logging system server;

receiving in the logging system server a plurality of messages from the client;

prioritizing by the logging system server the received messages; and transferring the messages from the server to the plugin in order of priority.

6. A computer operating system stored in a memory for controlling a target system to manipulate state information messages generated by a client system, comprising:

a plugin server for receiving a client-generated state information message; and a plugin, which includes a self-initialization routine and a service routine adhering to a predetermined protocol, coupled to the plugin server for receiving the message from the plugin server and for controlling the target system to manipulate the message.

7. The system of claim 6 wherein the plugin comprises a log plugin for adding the message to a message log; and the target system includes data storage for storing the message log.

8. The system of claim 6 further comprising a notification engine for notifying users; and a logging system server for receiving the message from the client system, and for transferring the message to the plugin server and to the engine.

9. The system of claim 6 further comprising a controller for managing system fatal errors; and a logging system server for receiving the message from the client system, and for transferring the message to the plugin server and to the controller.

10. The system of claim 9 wherein the memory comprises nonvolatile memory; and the controller stores the message in the nonvolatile memory.

11. The system of claim 10 wherein the plugin is a log plugin for adding messages to a message log; and upon system re-start the controller requests the log plugin to add the message to the message log.

12. The system of claim 6 further comprising a communications interface for communicating with remote systems;

a manager for controlling the communications interface to notify a remote user of a remote system; and a logging system server for receiving the message from the client and for transferring the message to the plugin server and to the manager.

13. The system of claim 6 further comprising a logging system server for receiving a plurality of messages from the client system, for prioritizing the messages, and for transferring the messages to the plugin in order of priority.

14. A computer data storage medium storing a program for causing a computer to perform the steps of:

providing a plugin, which includes a self-initialization routine adhering to a predetermined protocol, for receiving state information messages and controlling a target system;

executing the self-initialization routine for configuring the plugin; and using the plugin for receiving a client-generated state information message, and for controlling the target system to manipulate the message.

15. A computer system for causing a target system to manipulate state information messages generated by a client, comprising:

a plugin server coupled to the client for receiving client-generated state information messages a plugin, which includes a self-initialization routine adhering to a predetermined protocol, coupled to the plugin server for receiving a client-generated state information message and for controlling the target system to manipulate the message; and a processing unit for executing the self-initialization routine to configure the plugin.

16. A computer system for manipulating state information messages generated by a client, comprising:

a target system for performing a particular function;

memory, coupled to the target system, storing a program including
- a plugin server for receiving a client-generated state information message; and
- a plugin which uses a predetermined protocol for communicating with the plugin server and which controls the target system to perform the particular function on the state information message; and a processing unit coupled to the memory for controlling execution of the program.

17. The system of claim 16 wherein the plugin includes a log plugin for adding the message to a message log; and the target system includes data storage for storing the message log.

18. The system of claim 16 wherein the program further includes an engine for managing user notification; and a logging system server for receiving the message from the client, and for transferring the message to the plugin server and to the notification engine.

19. The system of claim 16 wherein the program further includes a controller for managing system fatal errors; and a logging system server for receiving the message from the client and for transferring the message to the plugin server and to the controller.

20. The system of claim 19 wherein the memory includes nonvolatile memory; and the controller stores the message in the nonvolatile memory until the system is re-started.

21. The system of claim 20 wherein the plugin is a log plugin for adding messages to a message log; and upon system re-start the controller requests the log plugin to add the message to the message log.

22. The system of claim 16 further comprising a communications interface for communicating with remote systems; and wherein the program further includes a manager for controlling the communications interface to notify a remote user of a remote system; and a logging system server for receiving the message from the client and for transferring the message to the plugin server and to the manager.

23. A computer data storage medium storing an operating system for recording a log of system state information generated by clients, comprising:

a plugin server for receiving state information messages from clients; and a log plugin coupled to the plugin server for creating a system state information log and for adding the message information to the log.

24. A method for manipulating a state information message generated by a client, comprising the steps of:

communicating a state information message from the client to a logging system server;

using the logging system server to prioritize the message;

sending the message based on its priority to plugins; and using the plugins to manipulate the message.

25. A method for reading a system log of state information messages, comprising the steps of:

receiving a log READ request from a client by a logging system server;

delivering the Request to a log plugin;

using the log plugin to create an iteration routine based on the READ request; and reading entries from the log based on the iteration routine.

* * * * *